United States Patent
Sarma et al.

(10) Patent No.: US 9,013,562 B2
(45) Date of Patent: Apr. 21, 2015

(54) METHODS AND SYSTEMS FOR PRESENTING SEQUENTIAL VIDEO FRAMES

(75) Inventors: Kalluri R. Sarma, Mesa, AZ (US);
John F. L. Schmidt, Phoenix, AZ (US);
Kanghua Lu, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 851 days.

(21) Appl. No.: 12/819,025

(22) Filed: Jun. 18, 2010

(65) Prior Publication Data

US 2011/0310234 A1 Dec. 22, 2011

(51) Int. Cl.
| H04N 13/04 | (2006.01) |
| G09G 3/34 | (2006.01) |
| G09G 3/36 | (2006.01) |
| H04N 13/00 | (2006.01) |
| H04N 5/66 | (2006.01) |

(52) U.S. Cl.
CPC ......... *H04N 13/0438* (2013.01); *G09G 3/3406* (2013.01); *G09G 3/3648* (2013.01); *G09G 2300/0814* (2013.01); *G09G 2300/0852* (2013.01); *G09G 2310/0237* (2013.01); *G09G 2320/0209* (2013.01); *H04N 13/0418* (2013.01); *H04N 13/0468* (2013.01); *H04N 13/0497* (2013.01)

(58) Field of Classification Search
USPC .......................................................... 348/53
See application file for complete search history.

(56) References Cited

U.S. PATENT DOCUMENTS

| 4,870,396 | A | * | 9/1989 | Shields ........................... 345/90 |
| 5,181,133 | A | | 1/1993 | Lipton |
| 5,666,130 | A | * | 9/1997 | Williams et al. ................. 345/90 |
| 6,476,785 | B1 | * | 11/2002 | Pathak et al. .................... 345/90 |
| 6,573,881 | B1 | | 6/2003 | Kwon |
| 7,180,485 | B2 | | 2/2007 | Kimura et al. |
| 7,483,001 | B2 | | 1/2009 | Matsueda |
| 7,545,353 | B2 | | 6/2009 | Koyama |
| 7,557,801 | B2 | | 7/2009 | Ozaki |
| 7,576,734 | B2 | | 8/2009 | Kimura |
| 7,646,363 | B2 | | 1/2010 | Yamashita et al. |
| 8,208,012 | B2 | * | 6/2012 | Leister et al. ................... 348/51 |
| 2002/0109659 | A1 | | 8/2002 | Hiroki |
| 2006/0164363 | A1 | | 7/2006 | Battersby et al. |
| 2007/0091058 | A1 | * | 4/2007 | Nam et al. ...................... 345/102 |
| 2008/0198120 | A1 | | 8/2008 | Senda et al. |
| 2010/0020062 | A1 | * | 1/2010 | Liou et al. ...................... 345/213 |
| 2010/0208043 | A1 | * | 8/2010 | Hoffman ......................... 348/53 |
| 2011/0157332 | A1 | * | 6/2011 | Kim et al. ....................... 348/56 |

OTHER PUBLICATIONS

Merritt, R.; 3-D TV Scene: Fast-Paced and a Bit Disorienting; Electronic Engineering Times, Feb. 8, 2010, pp. 24-25.

* cited by examiner

*Primary Examiner* — Christopher S Kelley
*Assistant Examiner* — Mohammed Jebari
(74) *Attorney, Agent, or Firm* — Ingrassia Fisher & Lorenz, P.C.

(57) ABSTRACT

Methods and systems are provided for presenting content comprising a plurality of frames using display panel comprising an array of display elements. A method comprises transferring image data for a first frame of the plurality of frames to a display element at the beginning of a first frame interval and activating an illumination assembly after transferring image data for the first frame to the display element to present the first frame. The method further comprises transferring image data for a second frame to an energy storage element corresponding to the display element during the first frame interval, and deactivating the illumination assembly prior to transferring the image data for the second frame from the energy storage element to the display element.

20 Claims, 7 Drawing Sheets

METHODS AND SYSTEMS FOR PRESENTING SEQUENTIAL VIDEO FRAMES

TECHNICAL FIELD

The subject matter described herein relates generally to display systems, and more particularly, embodiments of the subject matter relate to methods and systems for presenting sequential video frames.

BACKGROUND

Field-sequential stereo involves presenting an image (or frame) designated for one eye of the viewer (e.g., the right eye) followed by an image (or frame) designated for the other eye of the viewer (e.g., the left eye) on a display. Shutter glasses worn by the viewer are operated in sync with the images being presented to alternate which eye of the viewer receives the image being presented on the display. The images are presented at a sufficiently high frequency to avoid flicker or other distracting visual artifacts being perceived by the viewer, and the viewer perceives a three-dimensional image by fusing the images received by the left and right eyes and using parallax to achieve depth perception. However, the response time of display elements used in the display, such as liquid crystals used in liquid crystal displays (LCDs), may limit the performance of the display.

BRIEF SUMMARY

In accordance with one embodiment, a method is provided for presenting content comprising a plurality of frames. The method comprises transferring image data for a first frame of the plurality of frames to a display element at the beginning of a first frame interval and activating an illumination assembly after transferring image data for the first frame to the display element to present the first frame. The method further comprises transferring image data for a second frame to an energy storage element corresponding to the display element during the first frame interval, and deactivating the illumination assembly prior to transferring the image data for the second frame from the energy storage element to the display element.

In another embodiment, a display system is provided. The display system comprises a illumination assembly, a display panel comprising a plurality of display elements, and a control module coupled to the illumination assembly and the display panel. The control module is configured to transfer image data corresponding to a first frame of a plurality of frames to the plurality of display elements at the beginning of a first frame interval, store image data corresponding to a second frame for each display element of the plurality of display elements during the first frame interval activate the illumination assembly after transferring image data for the first frame to the plurality of display elements, and deactivate the illumination assembly prior to transferring the stored image data for the second frame to the plurality of display elements. The second frame image data for each display element is stored by an energy storage element corresponding to the respective display element.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
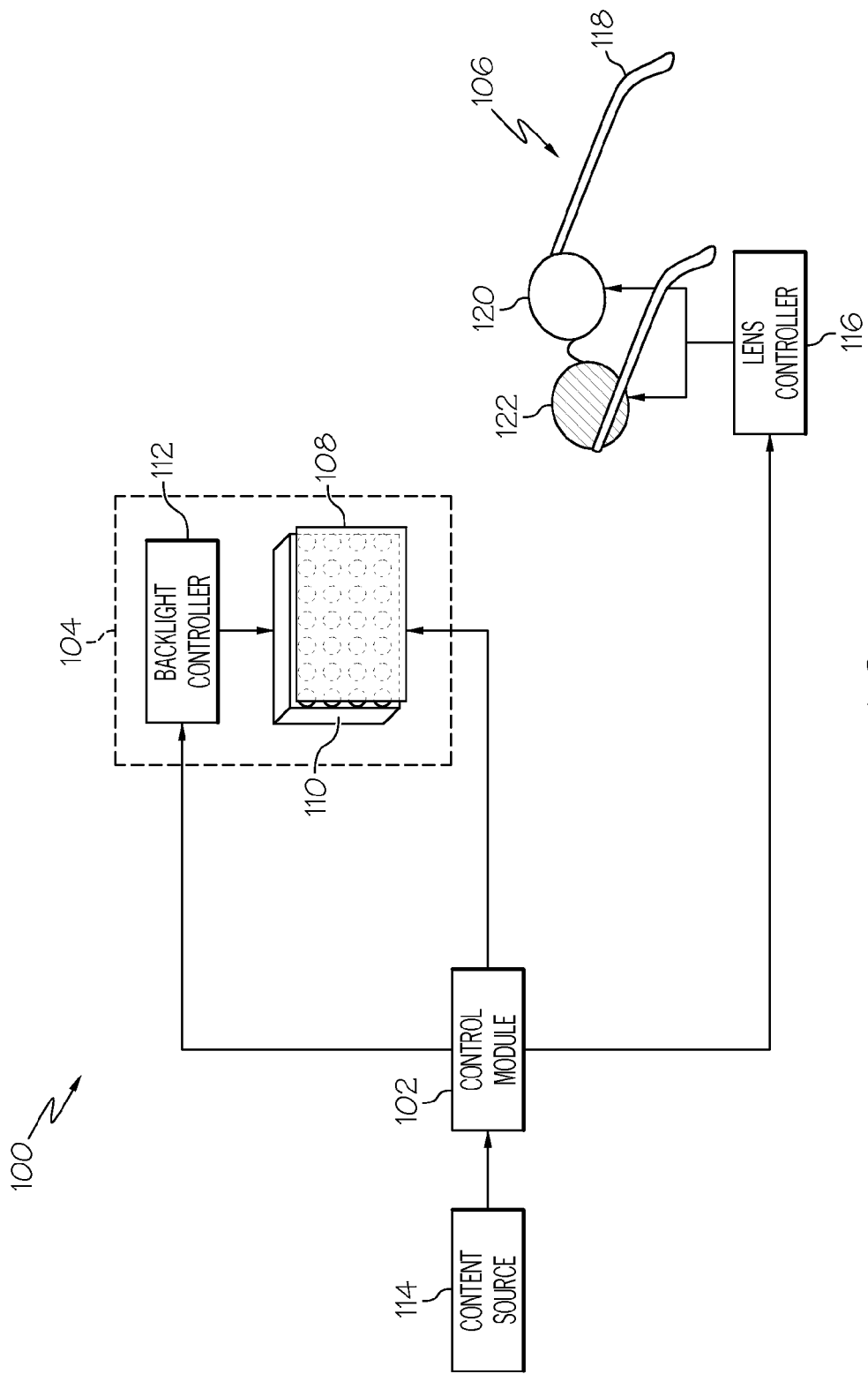
FIG. 1 is a block diagram of a display system in accordance with one embodiment.

The following detailed description is merely exemplary in nature and is not intended to limit embodiments of the subject matter or the application and uses of such embodiments. Any implementation described herein as exemplary is not necessarily to be construed as preferred or advantageous over other implementations. Furthermore, there is no intention to be bound by any theory presented in the preceding background or the following detailed description.

Technologies and concepts discussed herein relate generally to methods and systems for presenting sequential video frames using display elements of a display panel, such as a liquid crystal display (LCD). Various implementation aspects of the subject matter described herein are well known and so, in the interest of brevity, many conventional techniques related to image processing, video processing, video encoding and/or decoding, stereoscopic imaging, liquid crystals and/or LCDs, and other functional aspects of the systems (and the individual operating components of the systems) will only be mentioned briefly herein or will be omitted entirely without providing the well known details.

As described in greater detail below, in an exemplary embodiment, stored image data for a first frame of a plurality of video frames is transferred to display elements of a display panel at the beginning of a frame interval corresponding to the first frame. During the first frame interval, image data for a subsequent frame is stored for each of the display elements of the display panel. After the image data for the first frame is transferred to the display elements, a backlight for the display panel is activated or otherwise turned on to present the first frame to a viewer. The backlight is activated an amount of time after the beginning of the frame interval corresponding to the response time of the display elements of the display panel, such that the display elements have stable transmittance (or luminance) and the display panel accurately reflects the first frame when the backlight is activated. In the case of field-sequential stereo, where each frame of the plurality of video frames is encoded or otherwise designated for a particular eye of the viewer, a shutter lens aligned with the eye corresponding to the first frame may be activated or otherwise made transparent, thereby allowing the viewer to perceive the first frame with the appropriate eye. Before the subsequent frame interval, the backlight and the shutter lenses are deactivated, and the stored image data is transferred to the display elements at the beginning of the second frame interval. After the image data is transferred to the display elements of the display panel, the backlight for the display panel is activated and a second shutter lens corresponding to the second frame is activated. During the second frame interval, image data for a subsequent frame (e.g., a third frame) is stored for each of the display elements of the display panel, and so on.

By transferring image data for a respective video frame to all of the display elements at the beginning of the frame interval, the backlight and the appropriate shutter lens may be activated at an earlier time within the frame interval. Because the backlight is turned on and the shutter lens is transparent for a greater percentage of the frame interval, the perceived luminance and image quality of the display is improved. Image data for a subsequent video frame is stored during the frame interval corresponding to a preceding frame, thereby allowing the image data to be transferred to the display elements at the beginning of the subsequent frame interval. The backlight is turned off and the shutter lenses are returned to an opaque state before the stored image data is transferred to the display elements, thereby preventing crosstalk (i.e., a viewer perceiving a frame with the inappropriate eye) when field-sequential stereo imagery is presented.

FIG. 1 depicts an exemplary embodiment of a display system 100. The illustrated embodiment of display system 100 includes, without limitation, a control module 102, a display device 104, and a head-mountable device 106 including a pair of shutter lenses 120, 122. In the illustrated embodiment, the display device 104 includes a display panel 108, an illumination assembly 110, and a controller 112. In an exemplary embodiment, the illumination assembly 110 is realized as a backlight configured to direct light through the display panel 108, and accordingly, for convenience, but without limitation, the illumination assembly 110 is alternatively referred to herein as a backlight assembly and the controller 112 is alternatively referred to herein as a backlight controller. The control module 102 is coupled to the display panel 108 and configured to provide control signals to pixel drive circuits for the display elements of the display panel 108 to present images and/or video corresponding to content received from the content source 114, as described in greater detail below. In the illustrated embodiment, the control module 102 provides timing signals to the backlight controller 112 to control activation of the backlight assembly 110. The lenses 120, 122 are configured to be aligned with the eyes of a viewer and interposed in the viewer's line-of-sight between the viewer and the display device 104, wherein the control module 102 is configured to provide timing signals to a lens controller 116 to vary the transparency and/or opacity of the lenses 120, 122 and achieve stereoscopic imaging, as described in greater detail below. In this regard, FIG. 1 depicts the right lens 120 as being transparent and the left lens 122 as being opaque, however, as described in greater detail below, during operation of the display system 100, the left lens 122 may be transparent while the right lens 120 is being opaque or both lenses 120, 122 may be opaque concurrently.

The control module 102 generally represents the hardware, firmware, devices, components, circuitry and/or software (or combinations thereof) suitably configured to receive and process video content from the content source 114 and present images on the display device 104 corresponding to frames of the content received from the content source 114. The control module 102 may be implemented using any sort of microprocessor, microcontroller, digital signal processor or other logic capable of controlling the functionality and/or otherwise interacting with the display device 104. The control module 102 may also be associated with a suitably configured memory, such as any sort of static, dynamic, flash or other memory capable of storing instructions and/or data for processing by control module 102.

The content source 114 generally represents the devices, components, circuitry, and/or logic configured to provide video content to the control module 102. For example, in one embodiment, the content source 114 may comprise the output of a receiver system that receives video content over any sort of broadcast or other distribution channel, such as, for example, broadcast television, broadcast satellite, cable television, cellular or other wireless telephone networks, Internet or other data communications networks, physical media, and/or another suitable avenue for delivering content. In an exemplary embodiment, the video content provided by the content source 114 comprises a plurality of video frames that are encoded or otherwise configured for stereoscopic imaging. In this regard, each video frame comprises a still image that is designated for or otherwise intended to be perceived by either a left eye or a right eye of a viewer. As used herein, the content designated for and/or intended to be perceived by the left eye of a prospective viewer may be referred to herein as the left channel content (or left channel frame) and the content designated for and/or intended to be perceived by the right eye of a prospective viewer may be referred to herein as the right channel content (or right channel frame). In an exemplary embodiment, the right channel video frames comprise images captured by a first camera and the left channel video frames comprise images captured by a second camera positioned to the left of the first camera, resulting in parallax between the right channel content and the left channel content. Thus, when a viewer perceives the right channel content with his or her right eye and the left channel content with his or her left eye at substantially the same time, the parallax results in the viewer perceiving depth, thereby producing a three-dimensional image.

In an exemplary embodiment, the right channel frames and the left channel frames are spliced such that the content provided by the content source 114 includes frames that alternate between the right channel and the left channel, also known as field-sequential stereo or alternate-frame sequencing. For example, a first (or initial) frame of the content from the content source 114 may be encoded or otherwise designated for the right eye, a second frame subsequent the first frame may be encoded or otherwise designated for the left eye, a third frame subsequent the second frame may be encoded or otherwise designated for the right eye, and so on. In an exemplary embodiment, the frame rate of the video content provided by the content source 114 is greater than 120 Hz (or 120 frames per second), such that each eye perceives its corresponding frames at a rate of at least 60 frames per second to create the illusion of a moving picture with limited flickering or other visual artifacts that may otherwise be perceptible at lower frame rates. The synchronized sequential presentation of a right channel frame to the right eye and a left channel frame to the left eye provides the viewer the impression that the sequential right channel and left channel frames are being presented on the display device 104 simultaneously, resulting in a three-dimensional image.

In an exemplary embodiment, the display panel 108 comprises a substantially planar rectangular array of display elements interposed in a line-of-sight between the backlight assembly 110 and a viewer, such that the backlight assembly 110 illuminates the display panel 108 when the backlight assembly 110 is activated. In this regard, the display elements of the display panel 108 control the transmittance of light from the backlight assembly 110. The display elements are arranged in an array or matrix to provide pixels of the display device 104, wherein each pixel of the display device 104 is realized as one or more display elements of the display panel 108. In an exemplary embodiment, the display panel 108 comprises an active matrix display including a matrix of thin-film transistors (TFTs) for controlling voltage across the display elements to thereby modulate the polarization angle of light traveling from the backlight assembly 110 through the display panel 108 towards a viewer. Depending on the embodiment, the display elements may be realized as liquid crystals, organic light-emitting diodes, or another suitable light emitting or light modulating display. As described in greater detail below, each display element is associated with a plurality of thin-film transistors to provide a pixel drive circuit for controlling the electrical state and/or polarity of the respective pixel of the display device 104. Each pixel drive circuit includes at least one electrical energy storage element, such as a capacitor, that is utilized to store image data corresponding to the respective display element for a subsequent frame while the respective display element presents image data for the preceding frame, as described in greater detail below.

In an exemplary embodiment, the backlight assembly 110 is realized as one or more light sources, such as, for example, one or more light bulbs, light-emitting diodes (LEDs), fluorescent lamps, or the like. In accordance with one embodiment, the backlight assembly 110 may be realized as a steerable LED array comprising one or more LEDs configured to direct light through the display panel 108 towards the right eye of the viewer and one or more LEDs configured to direct light through the display panel 108 towards the left eye of the viewer, as described in greater detail below in the context of FIG. 7. The backlight controller 112 generally represents the hardware, firmware, processing logic and/or software that is communicatively coupled to the control module 102 and configured to operate the backlight assembly 110 in response to timing signals received from the control module 102. Depending on the embodiment, the backlight controller 112 may be implemented using any sort of microprocessor, microcontroller, digital signal processor or other logic capable of controlling the functionality and/or otherwise interacting with the backlight assembly 110. As described in greater detail below, the control module 102 and/or backlight controller 112 are configured to activate (or turn on) the backlight assembly 110 after refreshing (or updating) the display panel 108 with image data corresponding to a frame of the content received from content source 114 and deactivate (or turn off) the backlight assembly 110 before refreshing (or updating) the display panel 108 with image data corresponding to the subsequent frame of the content.

As shown in FIG. 1, in accordance with one or more embodiments, the head-mountable device 106 includes a support structure 118 adapted to be worn on the head of a viewer of display device 104 and configured to secure, support and/or house the pair of lenses 120, 122 such that the lenses 120, 122 are aligned with the eyes of the viewer. In other words, the lenses 120, 122 are interposed in the viewer's line of sight between the viewer and the display device 104 when the support structure 118 is worn on the user's head. In accordance with one embodiment, the support structure 118 is realized as an eyeglass frame, however, in alternative embodiments, the support structure 118 may be realized as a helmet, goggles, mask, visor, or the like, and may include straps or other elements to provide support and/or comfort to a user. In an exemplary embodiment, the head-mountable device 106 includes a lens controller 116, which may be integral with the support structure 118. The lens controller 116 generally represents the hardware, firmware, processing logic and/or software that is communicatively coupled to the control module 102 and configured to operate the lenses 120, 122 in response to timing signals received from the control module 102. Depending on the embodiment, the lens controller 116 may be implemented using any sort of microprocessor, microcontroller, digital signal processor or other logic capable of controlling the functionality and/or otherwise interacting with the lenses 120, 122.

In an exemplary embodiment, each lens 120, 122 has variable transparency and/or opacity, wherein the control module 102 and/or lens controller 116 is configured to control transparency and/or opacity of a respective lens 120, 122 such that the lens aligned with the right eye of the viewer (e.g., the right lens 120) is substantially transparent while the lens aligned with the left eye of the viewer (e.g., the left lens 122) is substantially opaque when a right channel frame is presented on the display device 104, and the right lens is substantially opaque while the left lens is substantially transparent when a left channel frame is presented on the display device 104. As described in greater detail below in the context of FIG. 4, the control module 102 and/or lens controller 116 are configured to deactivate the lenses 120, 122 before refreshing (or updating) the display panel 108 with image data corresponding to the subsequent frame of the content received from content source 114 to prevent an eye of the viewer from perceiving content designated for the other eye. Thus, it should be noted that although FIG. 1 depicts the right lens 120 as being transparent and the left lens 122 as being opaque, during operation of the display system 100, at various times, the right lens 120 may be opaque while the left lens 122 is transparent or both lenses 120, 122 may be opaque concurrently.

It should be understood that FIG. 1 is a simplified representation of the display system 100 for purposes of explanation and ease of description, and FIG. 1 is not intended to limit the application or scope of the subject matter in any way. In this regard, although FIG. 1 is described in the context of an implementation using a backlight assembly or a backlit display panel, the subject matter described herein is not intended to be limited to use with backlit display panels, and in practice, the subject matter described herein may be utilized with frontlit display panels or using any suitable illumination assembly configured to direct light towards the display panel 108. Additionally, although FIG. 1 depicts the control module 102 and the display device 104 as discrete components, in some embodiments, the control module 102 and the display device 104 may be realized as an integrated product. In some embodiments, the features and/or functionality of the backlight controller 112 may be integrated into control module 102. In practice, the display system 100 may include numerous other devices and components for providing additional functions and features, as will be appreciated in the art.

Figure 2:
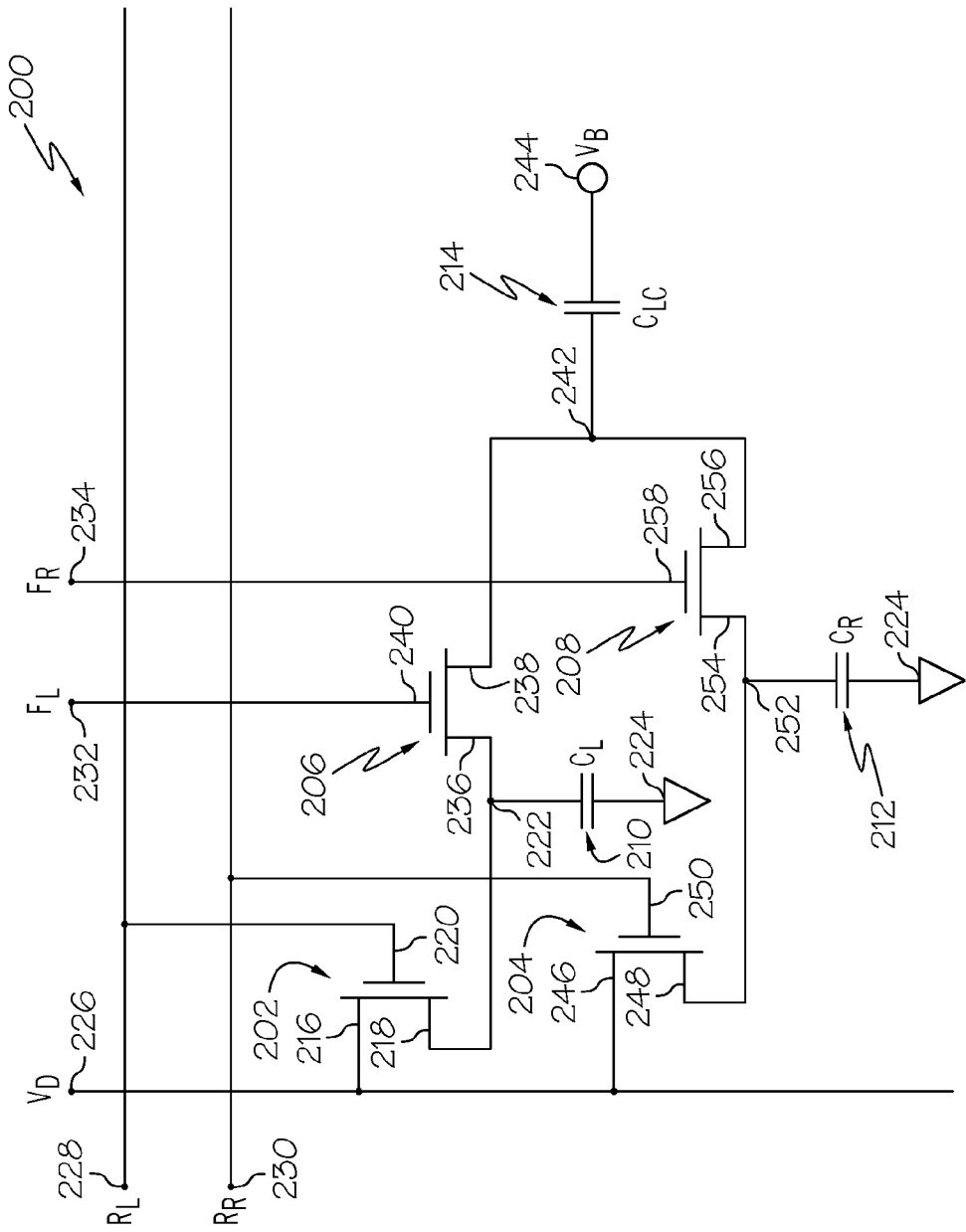
FIG. 2 is a schematic view of a pixel drive circuit suitable for use with a display element in a display panel in the display system of FIG. 1 in accordance with one embodiment.

FIG. 2 depicts an exemplary pixel drive circuit 200 suitable for use with a display element to provide a pixel in a display panel, such as the display panel 108 of FIG. 1, in accordance with one embodiment. The illustrated embodiment of the pixel drive circuit 200 includes, without limitation, a plurality of transistors 202, 204, 206, 208, a plurality of electrical energy storage elements 210, 212, and a display element 214. In an exemplary embodiment, the display element 214 is realized as a liquid crystal which is represented electrically as a capacitance ($C_{LC}$). Accordingly, for convenience, but without limitation, the display element 214 is alternatively referred to herein as a liquid crystal. In an exemplary embodiment, the electrical energy storage elements 210, 212 are realized as capacitors. In practice, the pixel drive circuit 200 is replicated and arranged in a conventional manner to provide horizontally-aligned rows and vertically-aligned columns, resulting in an array or matrix of pixels for a LCD panel, such as display panel 108.

In an exemplary embodiment, the transistors 202, 204, 206, 208 are realized as thin-film transistors. First and second transistors 202, 204 are designed (and matched with respect to threshold voltage, and channel width to length ratio) to provide sufficient gate drive potential for charging their respective energy storage element 210, 212, during one row time. Third and fourth transistors 206, 208 are designed and matched to transfer the energy from their respective energy storage element 210, 212 to the liquid crystal 214. Similarly, in an exemplary embodiment, the capacitors 210, 212 are realized as thin-film capacitors, and may be matched and have substantially the same electrical characteristics. In an exemplary embodiment, the capacitance of the capacitors 210, 212 is within the range of about one to two times the capacitance of the liquid crystal 214, and is typically less than about one picofarad. As described in greater detail below, the capacitors 210, 212 are used to store image data for a subsequent frame while image data for the current frame is transferred to and/or presented by the liquid crystal 214.

In the illustrated embodiment, a source terminal 216 of a first transistor 202 is coupled to a node 226 configured to receive a voltage ($V_D$) corresponding to the image data for the respective pixel (e.g., liquid crystal 214). For example, the voltage ($V_D$) at node 226 may correspond to an intended grayscale luminance or transmittance for the respective pixel of the LCD. In an exemplary embodiment, the image data node 226 corresponds to a column line that is coupled to each pixel drive circuit 200 of a respective column of pixels of the LCD panel. The drain terminal 218 of the first transistor 202 is coupled to a first capacitor 210 at node 222. As shown, in an exemplary embodiment, the capacitor 210 is coupled between node 222 and a ground reference node 224 for the pixel drive circuit 200. The gate terminal 220 of the first transistor 202 is coupled to a node 228 configured to receive a left channel row select signal ($R_L$) for the row including the respective pixel (e.g., liquid crystal 214). In this regard, node 228 corresponds to a left channel row select line that is coupled to each pixel drive circuit 200 of a respective row of pixels of the LCD panel. As described in greater detail below, when the voltage ($V_D$) at node 226 corresponds to the left channel image data for the respective pixel (e.g., liquid crystal 214), a voltage that exceeds the threshold voltage of the first transistor 202 is applied at node 228 for a sufficient duration such that the voltage ($V_D$) is transferred to and stored across capacitor 210. Accordingly, capacitor 210 may alternatively be referred to herein as the left channel storage capacitor. Thus, when voltages of the column lines corresponds to the left channel image data for a respective row pixels, a voltage that exceeds the threshold voltage of the first transistor 202 is applied at node 228 for one row time to store the left channel image data for the respective row of pixels to the left channel storage capacitors of the respective row of liquid crystals.

In a similar manner, a source terminal 246 of a second transistor 204 is coupled to node 226 and the drain terminal 248 of the second transistor 204 is coupled to the second capacitor 212 at node 252, wherein the capacitor 212 is coupled between node 252 and the ground reference node 224 for the pixel drive circuit 200. The gate terminal 250 of the second transistor 204 is coupled to a node 230 configured to receive a right channel row select signal ($R_R$) for the row including the respective pixel (e.g., liquid crystal 214). In this regard, node 230 corresponds to a right channel row select line that is coupled to each pixel drive circuit 200 of a respective row of pixels of the LCD panel. When the voltage ($V_D$) at node 226 corresponds to the right channel image data for the respective pixel (e.g., liquid crystal 214), a voltage that exceeds the threshold voltage of the second transistor 204 is applied at node 230 for a sufficient duration such that the voltage ($V_D$) is transferred to and stored across capacitor 212. Accordingly, capacitor 212 may alternatively be referred to herein as the right channel storage capacitor. Thus, when voltages of the column lines corresponds to the right channel image data for a respective row pixels, a voltage that exceeds the threshold voltage of the second transistor 204 is applied at node 228 for one row time to store the right channel image data for the respective row of pixels to the right channel storage capacitors of the respective row of liquid crystals.

A source terminal 236 of a third transistor 206 is coupled to the left channel storage capacitor 210 at node 222 and the drain terminal 238 of the third transistor 206 is coupled to the liquid crystal 214 at node 242. A gate terminal 240 of the third transistor 206 is coupled to a node 232 configured to receive a left channel frame select signal ($F_L$). As described in greater detail below, to refresh or update the LCD panel including the liquid crystal 214 and/or pixel drive circuit 200 to display left channel image data, a voltage that exceeds the threshold voltage of the third transistor 206 is applied at node 232 for a sufficient duration such that the voltage stored by the left channel storage capacitor 210 is transferred to node 242 and stored across the liquid crystal 214. In a similar manner, a source terminal 254 of a fourth transistor 208 is coupled to the right channel storage capacitor 212 at node 252 and the drain terminal 256 of the fourth transistor 208 is coupled to the liquid crystal 214 at node 242. A gate terminal 258 of the fourth transistor 208 is coupled to a node 234 configured to receive a right channel frame select signal ($F_R$). As described in greater detail below, to refresh or update the LCD panel including the liquid crystal 214 and/or pixel drive circuit 200 to display right channel image data, a voltage that exceeds the threshold voltage of the fourth transistor 208 is applied at node 234 for a sufficient duration such that the voltage stored by the right channel storage capacitor 212 is transferred to node 242 and stored across the liquid crystal 214. In an exemplary embodiment, the node 232 corresponds to a left channel frame select line coupled to each pixel drive circuit 200 of an LCD panel and node 234 corresponds to a right channel frame select line coupled to each pixel drive circuit 200 of the LCD panel. As shown, the liquid crystal 214 coupled between node 242 and a node 244 configured to receive a bias voltage ($V_B$), wherein the bias voltage is chosen to minimize the perceived display flicker by balancing the voltage developed across the liquid crystal 214.

It should be understood that FIG. 2 is a simplified representation of a pixel drive circuit 200 for purposes of explanation and ease of description, and FIG. 2 is not intended to limit the application or scope of the subject matter in any way. In this regard, it should be noted that although FIG. 2 may be described in the context of an implementation using n-type transistors, numerous equivalent circuits may be implemented (e.g., using only p-type transistors or combinations of n-type and p-type transistors). Additionally, although FIG. 2 depicts direct electrical connections between circuit elements and/or terminals, alternative embodiments may employ intervening circuit elements and/or components while functioning in a substantially similar manner.

Figure 3:
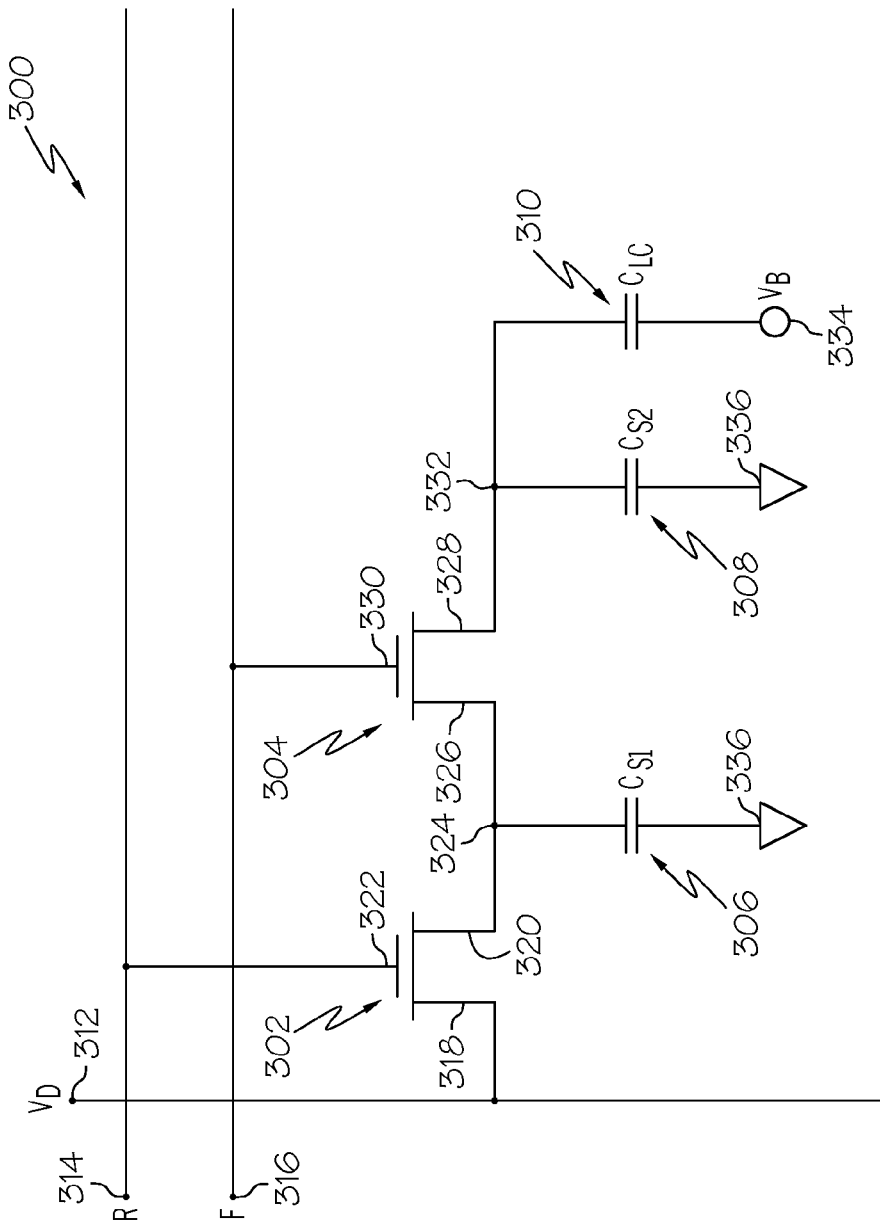
FIG. 3 is a schematic view of a pixel drive circuit suitable for use with a display element in a display panel in the display system of FIG. 1 in accordance with another embodiment.

FIG. 3 depicts an exemplary pixel drive circuit 300 suitable for use with a liquid crystal to provide a pixel in a display panel, such as the display panel 108 of FIG. 1, in accordance with another embodiment. The illustrated embodiment of the pixel drive circuit 300 includes, without limitation, a plurality of transistors 302, 304, a plurality of electrical energy storage elements, such as capacitors 306, 308, and a display element 310. In an exemplary embodiment, the display element 310 is realized as a liquid crystal which is represented electrically as a capacitance ($C_{LC}$). Accordingly, for convenience, but without limitation, the display element 310 is alternatively referred to herein as a liquid crystal. In practice, the pixel drive circuit 300 is replicated and arranged in a conventional manner to provide horizontally-aligned rows and vertically-aligned columns, resulting in an array or matrix of pixels for a LCD panel, such as display panel 108. As described above, in an exemplary embodiment, the transistors 302, 304 are realized as thin-film transistors and the capacitors 306, 308 are realized as thin-film capacitors. The capacitance of the capacitors 306, 308 is within the range of about one to two times the capacitance of the liquid crystal 310. As described in greater detail below, the first capacitor 306 is used to store image data for a subsequent frame while image data for the current frame is transferred to and/or presented by the second capacitor 308 and/or liquid crystal 310.

In the illustrated embodiment of FIG. 3, a source terminal 318 of the first transistor 302 is coupled to a node 312 configured to receive a voltage ($V_D$) corresponding to the image data for the respective pixel (e.g., liquid crystal 310). In an exemplary embodiment, the image data node 312 corresponds to a column line that is coupled to each pixel drive circuit 300 of a respective column of pixels of the LCD panel. The drain terminal 320 of the first transistor 302 is coupled to the first capacitor 306 at node 324. As shown, in an exemplary embodiment, the capacitor 306 is configured electrically in parallel between node 324 and a ground reference node 336 for the pixel drive circuit 300. The gate terminal 322 of the first transistor 302 is coupled to a node 314 configured to receive a row select signal (R) for the row including the respective pixel (e.g., liquid crystal 310). In this regard, node 314 corresponds to a row select line that is coupled to each pixel drive circuit 300 of a respective row of pixels of the LCD panel. As described in greater detail below, when the voltage ($V_D$) at node 312 corresponds to the image data for the respective pixel (e.g., liquid crystal 310), a voltage that exceeds the threshold voltage of the first transistor 302 is applied at node 314 for a sufficient duration such that the voltage ($V_D$) is stored across capacitor 306. Accordingly, capacitor 306 may alternatively be referred to herein as a storage capacitor. Thus, when voltages of the column lines corresponds to image data for a respective row pixels, a voltage that exceeds the threshold voltage of the first transistor 302 is applied at node 314 for one row time to store the image data for the respective row of pixels to the storage capacitors of the respective row of liquid crystals.

A source terminal 326 of the second transistor 304 is coupled to the storage capacitor 306 at node 324 and the drain terminal 328 of the second transistor 304 is coupled to the liquid crystal 310 and the second capacitor 308 at node 332. A gate terminal 330 of the second transistor 304 is coupled to a node 316 configured to receive a frame select signal (F). As described in greater detail below, to refresh or update the LCD panel including the liquid crystal 310 and/or pixel drive circuit 300, a voltage that exceeds the threshold voltage of the second transistor 304 is applied at node 316 for a sufficient duration such that the voltage stored by the storage capacitor 306 is transferred to the second capacitor 308 and/or liquid crystal 310 at node 332. As shown, the second capacitor 308 is configured between node 332 and the ground reference node 336 for the pixel drive circuit 300 and the liquid crystal 310 is configured between node 332 and a node 334 configured to receive a bias voltage ($V_B$), in a similar manner as described above. In an exemplary embodiment, the node 316 corresponds to a frame select line coupled to each pixel drive circuit 300 of the LCD panel.

It should be understood that FIG. 3 is a simplified representation of a pixel drive circuit 300 for purposes of explanation and ease of description, and FIG. 3 is not intended to limit the application or scope of the subject matter in any way. In this regard, it should be noted that although FIG. 3 may be described in the context of an implementation using n-type transistors, numerous equivalent circuits may be implemented (e.g., using only p-type transistors or combinations of n-type and p-type transistors). Additionally, although FIG. 3 depicts direct electrical connections between circuit elements and/or terminals, alternative embodiments may employ intervening circuit elements and/or components while functioning in a substantially similar manner.

Figure 4:
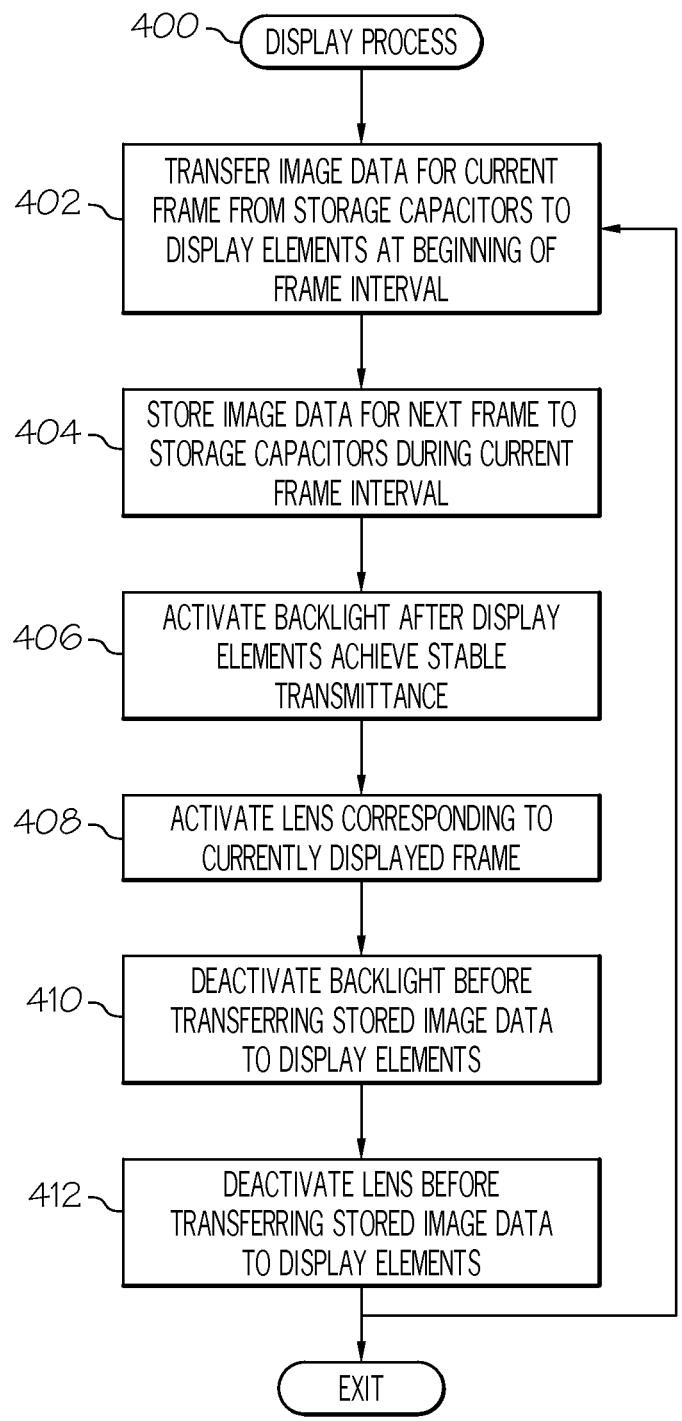
FIG. 4 is a flow diagram of a display process suitable for use with the display system of FIG. 1 in accordance with one embodiment.

Referring now to FIG. 4, in an exemplary embodiment, a display system may be configured to perform a display process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the control module 102, the display panel 108, the backlight assembly 110, the backlight controller 112, the lens controller 116, the lenses 120, 122, pixel drive circuit 200 and/or pixel drive circuit 300. It should be appreciated that any number of additional or alternative tasks may be included, and may be incorporated into a more comprehensive procedure or process having additional functionality not described in detail herein.

Referring to FIG. 4, and with continued reference to FIGS. 1-3, the display process 400 may be performed to present stereoscopic video on a display device including a display panel. In an exemplary embodiment, the display process 400 begins by transferring or otherwise writing image data for a video frame corresponding to one eye of the viewer to the display elements of the display panel at the beginning of a frame interval corresponding to the respective video frame (task 402). In this regard, stored voltages corresponding to the image data for the video frame are transferred from storage capacitors to their associated display elements at the beginning of the frame interval. For example, the control module 102 may operate pixel drive circuits 200, 300 of the display panel 108 to transfer voltages representing stored image data for a right channel frame of the content from content source 114 from storage capacitors to their corresponding display elements of the display panel 108. The display process 400 continues by writing, transferring, or otherwise storing image data for a subsequent video frame corresponding to the other eye of the viewer (task 404). In this regard, voltages corresponding to the image data for the subsequent video frame are transferred to storage capacitors during the current frame interval while the display elements present image data corresponding to the preceding video frame. For example, the control module 102 may operate pixel drive circuits 200, 300 of the display panel 108 to store voltages corresponding to a left channel frame of the content from content source 114 to storage capacitors while the display elements are presenting the preceding right channel frame. In this manner, image data encoded and/or designated for one eye of the viewer (e.g., a left channel frame) is stored during a frame interval while the image data encoded and/or designated for the other eye of the viewer (e.g., a right channel frame) is being presented by the display elements of the display panel 108.

In an exemplary embodiment, the display process 400 continues by activating the backlight assembly after the image data has been completely transferred to the display elements of the display panel (task 406). In this regard, the control module 102 activates or otherwise turns on the backlight assembly 110 once the display elements of the display panel have achieved stable transmittance and/or luminance (e.g., their commanded grayscale luminance values) to illuminate the display panel 108 and present or otherwise display the image data for the current video frame to the viewer. The display process 400 continues by activating or otherwise increasing the transparency of the shutter lens corresponding to the video frame currently being presented by the display panel (task 408). In this regard, if the display panel 108 and/or display device 104 is currently presenting image data corresponding to a right channel frame, the control module 102 and/or lens controller 116 activates the right lens 120 and deactivates the left lens 122, such that the right lens 120 is substantially transparent and the left lens 122 is substantially opaque, thereby allowing a viewer to perceive the right channel frame with his or her right eye. In an exemplary embodiment, the display process 400 continues by deactivating the backlight assembly and the shutter lenses at the end of the current frame interval before the next frame interval begins (tasks 410, 412). In this regard, the control module 102 and/or backlight controller 112 deactivates or otherwise turns off the backlight assembly 110, and the control module 102 and/or lens controller 116 deactivates or otherwise increases the opacity of both lenses 120, 122 before updating and/or refreshing the display panel 108. In this manner, the backlight assembly 110 does not illuminate the display panel 108 and both lenses 120, 122 are substantially opaque prior to transferring image data for the subsequent frame at the beginning of the next frame interval.

In an exemplary embodiment, after deactivating the backlight assembly and the shutter lenses, the loop defined by tasks 402, 404, 406, 408, 410, 412 repeats throughout operation of the display system 100 for each subsequent frame interval. For example, the control module 102 may operate pixel drive circuits 200, 300 of the display panel 108 to transfer stored image data for a left channel frame from storage capacitors to the display elements of the display panel 108 and store voltages representative of a subsequent right channel frame to storage capacitors. After transferring the left channel frame data to the display elements, the control module 102 and/or backlight controller 112 activates or otherwise turns on the backlight assembly 110 such that the backlight assembly 110 illuminates the display panel 108, and the control module 102 and/or lens controller 116 activates the left lens 122 and deactivates the right lens 120 to allow the left channel image data being presented by the display device 104 to be perceived by the viewer. At the end of the left channel frame interval, the backlight assembly 110 and lenses 120, 122 are deactivated before the control module 102 operates the pixel drive circuits 200, 300 of the display panel 108 to transfer stored image data for a right channel frame from storage capacitors to the display elements of the display panel 108 and store voltages representative of a subsequent left channel frame to storage capacitors. After transferring the right channel frame data to the display elements, the control module 102 and/or backlight controller 112 activates or otherwise turns on the backlight assembly 110 such that the backlight assembly 110 illuminates the display panel 108, and the control module 102 and/or lens controller 116 activates the right lens 120 and deactivates the left lens 122 to allow the right channel image data being presented by the display device 104 to be perceived by the viewer.

Figure 5:
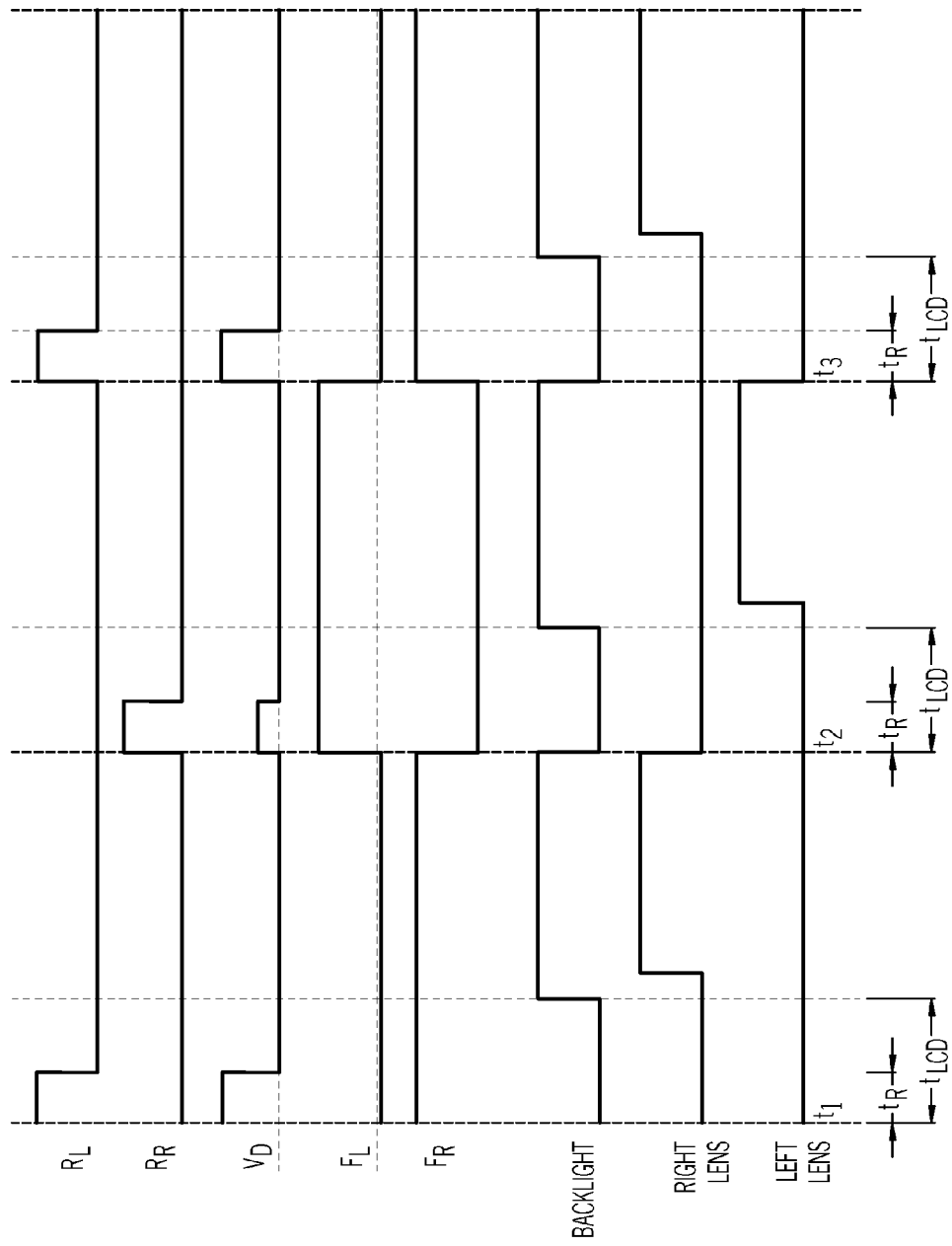
FIG. 5 is a timing diagram illustrating an exemplary implementation of the display process of FIG. 4 using the pixel drive circuit of FIG. 2 with the display panel in the display system of FIG. 1 in accordance with one embodiment.

FIG. 5 depicts a timing diagram of an exemplary implementation of display process 400 using a display panel, such as display panel 108, comprised of pixel drive circuit 200. In such embodiments, the pixel drive circuit 200 is replicated and arranged in a conventional manner to provide horizontally-aligned rows and vertically-aligned columns, resulting in an array or matrix of pixels for the display panel 108, as described above. Referring now to FIGS. 1-2 and 4-5, for a right channel frame interval, at the beginning of the frame interval (at time $t_1$), the control module 102 provides a right channel frame select voltage signal at node 234 ($F_R$) that exceeds the threshold voltage of the fourth transistor 208 relative to node 242 to activate or otherwise turn on the fourth transistor 208 and transfer the voltage corresponding to the right channel frame that is stored by the right channel storage capacitor 212 (or alternatively, the voltage at node 252) to the liquid crystal 214 at node 242. At the same time, the control module 102 ensures the third transistor 206 is deactivated or otherwise turned off by applying a voltage signal at node 232 ($F_L$) that is less than the threshold voltage of the third transistor 206 relative to node 242. The control module 102 provides the voltage at node 234 for a duration of time that is greater than or equal to the amount of time required to sufficiently charge the capacitance of node 242 (e.g., the capacitance of the liquid crystal 214) to a voltage equal to the voltage at node 252 less the voltage drop across the fourth transistor 208 when the fourth transistor 208 is conducting current. As shown in FIG. 5, in accordance with one or more embodiments, the voltage at node 234 may be provided for the entire duration of the right channel frame interval, or in other words, until the beginning of the subsequent left channel frame interval at time $t_2$. In this manner, for each liquid crystal 214 of the display panel 108, the control module 102 transfers the right channel frame image data corresponding to the respective liquid crystal 214 at the beginning of the right channel frame interval.

To write, transfer, or otherwise store image data corresponding to the next left channel frame, the control module 102 provides a voltage signal at node 228 ($R_L$) that exceeds the threshold voltage of the first transistor 202 at a time within the current right channel frame interval when the voltage at node 226 ($V_D$) corresponds to the left channel frame image data for the respective liquid crystal 214. In this regard, although FIG. 5 depicts the voltage at node 228 being applied at the beginning of the right channel frame interval, the time at which the voltage at node 228 is applied will vary depending on the particular row of the display panel 108 that the respective liquid crystal 214 is in. For example, the control module 102 may sequentially write the image data for the next frame by applying voltages across the columns of the display panel 108 corresponding to the image date for the first row of pixels (or liquid crystals) and simultaneously applying the appropriate row select signal for the first row of pixels, before changing the voltages applied across the columns of the display panel 108 to correspond to the image date for the second row of pixels (or liquid crystals) and simultaneously applying the appropriate row select signal for the second row of pixels, and so on. In this regard, for each respective pixel drive circuit 200 of the first row of display panel 108, the control module 102 applies a left channel row select signal at node 228 when the image data voltages across the columns of the display panel 108 (e.g., at the respective node 226) correspond to the left channel image data for the first row of pixels to write, transfer, or otherwise store the left channel image data for the subsequent left channel frame to the left channel storage capacitor 210 for the respective liquid crystal 214. Similarly, for each row of the display panel 108, the control module 102 applies a left channel row select signal at node 228 when the image data voltages across the columns of the display panel 108 (e.g., at the respective node 226) correspond to the left channel image data for the respective row of pixels to write, transfer, or otherwise store the left channel image data for the subsequent left channel frame to the left channel storage capacitor 210 for the respective liquid crystal 214.

The control module 102 provides the row select voltage signal at node 228 for a duration of time ($t_R$) that is greater than or equal to the amount of time required to sufficiently charge the capacitance ($C_L$) of the left channel storage capacitor 210 such that the voltage at node 222 is substantially equal to the voltage at node 226, that is, equal to the voltage of node 226 minus the voltage drop across the first transistor 202 when the first transistor 202 is on. The duration of the row time ($t_R$) is less than or equal the duration of the frame interval divided by the number of rows of the display panel to ensure that the image data for the subsequent frame may be transferred, written to, or otherwise stored to the storage capacitor for each row of liquid crystals during the preceding frame interval. In an exemplary embodiment, the duration of each frame interval (e.g., $t_2-t_1$) is less than or equal to one one-hundred and twentieth of a second (e.g., less than or equal to 8.33 milliseconds), such that the right channel frames and the left channel frames are each presented to the viewer at a refresh rate of at least 60 Hz. The control module 102 ensures the second transistor 204 is deactivated or otherwise turned off while the first transistor 202 is on and/or the voltage at node 226 corresponds to a left channel frame by applying a voltage signal at node 230 that is less than the threshold voltage of the second transistor 204 relative to node 252. After transferring the left channel image data to the storage capacitor 210 for a respective liquid crystal 214, the control module 102 deactivates or otherwise turns off the first transistor 202 for the remainder of the frame interval by applying a voltage signal at node 228 that is less than the threshold voltage of the first transistor 202 relative to node 226 to prevent the voltage at node 226 from being modified before it is transferred to the liquid crystal 214.

In an exemplary embodiment, the control module 102 signals the backlight controller 112 to activate or otherwise turn on the backlight assembly 110 at a particular time ($t_{LCD}$) after the beginning of the right channel frame interval. In an exemplary embodiment, the time ($t_{LCD}$) after the beginning of the frame interval at which the backlight assembly 110 is activated corresponds to the amount of time required to ensure the each of the liquid crystals of the display panel 108 has achieved a stable transmittance and/or luminance (e.g., its commanded grayscale luminance value) in response to the voltage at node 242 and corresponds to the response time of the display panel 108. In this regard, the control module 102 signals the backlight controller 112 to activate or otherwise turn on the backlight assembly 110 after the right channel frame image data has been completely transferred from the right channel storage capacitors 212 to the liquid crystals 214. The control module 102 signals the lens controller 116 to activate the right lens 120 and deactivate the left lens 122 at a particular time after the beginning of the right channel frame interval that is greater than or equal to the amount of time required for the liquid crystals to achieve a stable transmittance and/or luminance. In this regard, although FIG. 5 illustrates the right lens 120 being activated after the backlight assembly 110 is activated, in some embodiments, the control module 102 may synchronously activate the right lens 120 and the backlight assembly 110. In this manner, the right lens 120 is transparent after the right channel frame image data has been completely transferred from the right channel storage capacitors 212 to the liquid crystals 214.

Before the subsequent left channel frame interval, the control module 102 signals the backlight controller 112 to deactivate or otherwise turn off the backlight assembly 110, and the control module 102 also signals the lens controller 116 to deactivate both lenses 120, 122. In this manner, left channel frame image data is prevented from being perceived by the right eye of the viewer when the display panel 108 is refreshed or updated and energy is conserved by deactivating the backlight assembly 110 when the lenses 120, 122 are both opaque. As shown in FIG. 5, in some embodiments, the control module 102 may synchronously deactivate the right lens 120 and the backlight assembly 110. In other embodiments, the right lens 120 may be deactivated prior to deactivating the backlight assembly 110.

At the beginning of the subsequent left channel frame interval (at time $t_2$), the control module 102 provides a left channel frame select voltage signal at node 232 ($F_L$) that exceeds the threshold voltage of the third transistor 206 relative to node 242 to activate or otherwise turn on the third transistor 206 and transfer the voltage corresponding to the left channel frame that was transferred to the left channel storage capacitor 210 (or alternatively, the voltage at node 222) during the preceding right channel frame interval to the liquid crystal 214 at node 242. At the same time, the control module 102 ensures the fourth transistor 208 is deactivated or otherwise turned off by applying a voltage signal at node 234 ($F_R$) that is less than the threshold voltage of the fourth transistor 208 relative to node 242. As described above, the control module 102 provides the voltage at node 232 for a duration of time that is greater than or equal to the amount of time required to sufficiently charge the capacitance of node 242 (e.g., the capacitance of the liquid crystal 214) to a voltage substantially equal to the voltage at node 222.

During the left channel frame interval, the control module 102 provides a voltage at node 230 ($R_R$) that exceeds the threshold voltage of the second transistor 204 relative to node 252 to write, transfer, or otherwise store image data corresponding to the next right channel frame to the right channel storage capacitor 212 at the appropriate time within the left channel frame interval when the voltage at node 226 corresponds to the right channel frame image data for the respective liquid crystal 214. As described above, for each row of the display panel 108, the control module 102 applies a right channel row select signal at node 228 when the image data voltages across the columns of the display panel 108 correspond to the right channel image data for the respective row of pixels to write, transfer, or otherwise store the right channel image data for the subsequent right channel frame to the right channel storage capacitor 212 for the respective liquid crystal 214. The control module 102 provides the row select voltage signal at node 230 for one row time ($t_R$) to sufficiently charge the capacitance ($C_R$) of the right channel storage capacitor 212 such that the voltage at node 252 is substantially equal to the voltage at node 226 minus the voltage drop across the second transistor 204. The control module 102 ensures the first transistor 202 is deactivated or otherwise turned off while the second transistor 204 is on and/or the voltage at node 226 corresponds to a right channel frame by applying a voltage signal at node 228 that is less than the threshold voltage of the first transistor 202 relative to node 222.

As described above, the control module 102 signals the backlight controller 112 to activate or otherwise turn on the backlight assembly 110 at a particular time ($t_{LCD}$) after the beginning of the left channel frame interval corresponding to the amount of time required for each of the liquid crystals of the display panel 108 to achieve a stable transmittance and/or luminance, and the control module 102 signals the lens controller 116 to activate the left lens 122 and deactivate the right lens 120 either in sync with the backlight assembly 110 or after activating the backlight assembly 110. Thus, the backlight assembly 110 is activated and left lens 122 is transparent after the left channel frame image data has been completely transferred to the liquid crystals. Prior to the beginning of the subsequent right channel frame interval (at time $t_3$), the control module 102 signals the backlight controller 112 to deactivate or otherwise turn off the backlight assembly 110, and the control module 102 also signals the lens controller 116 to deactivate the both lenses 120, 122, before transferring the right channel frame image data at the beginning of the right channel frame interval, as described above.

Figure 6:
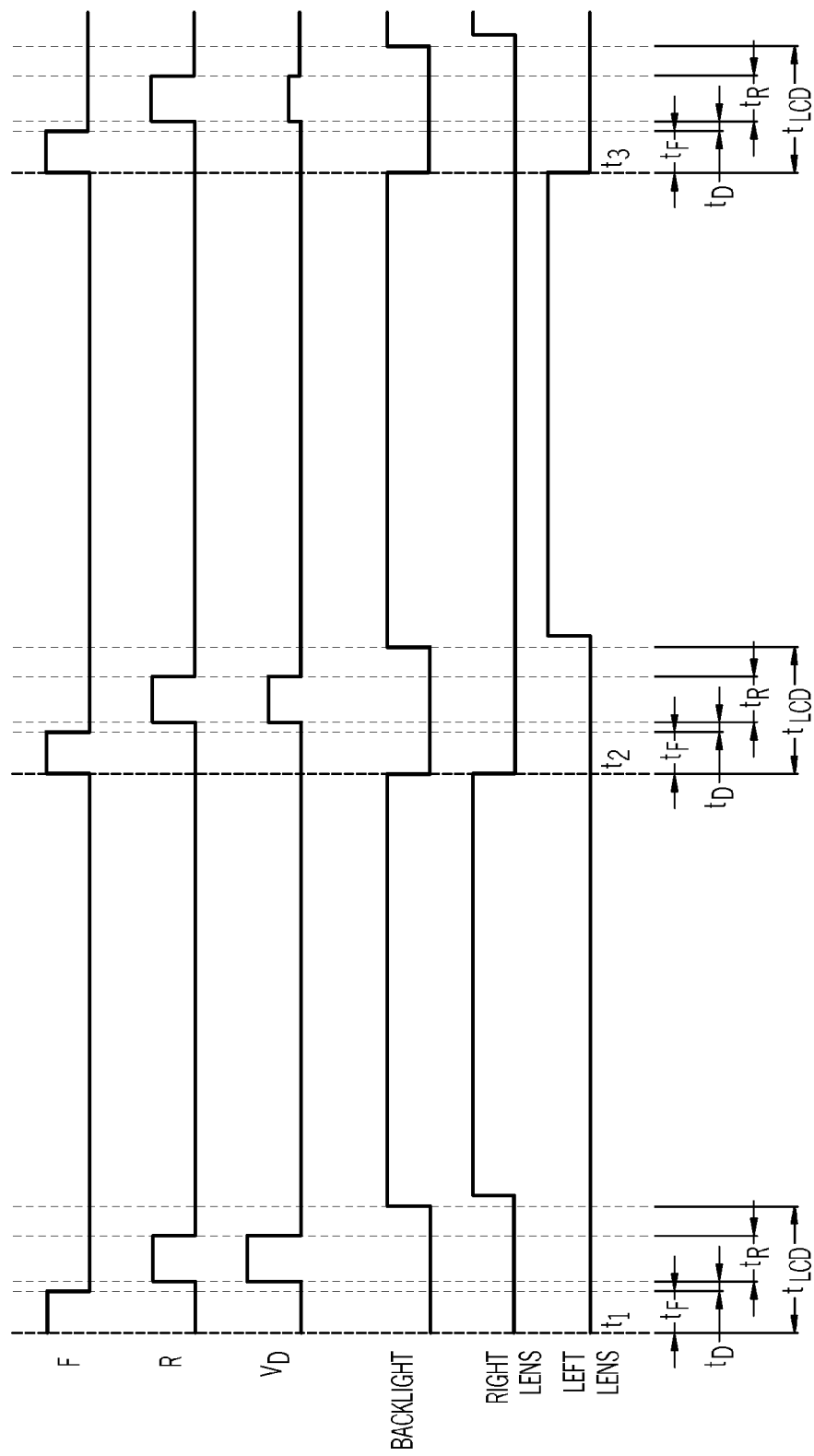
FIG. 6 is a timing diagram illustrating an exemplary implementation of the display process of FIG. 4 using the pixel drive circuit of FIG. 3 with the display panel in the display system of FIG. 1 in accordance with one embodiment.

FIG. 6 depicts a timing diagram of an exemplary implementation of display process 400 using a display panel, such as display panel 108, comprised of pixel drive circuit 300. In this regard, the pixel drive circuit 300 is replicated and arranged in a conventional manner to provide horizontally-aligned rows and vertically-aligned columns, resulting in an array or matrix of pixels for the display panel 108, as described above. Referring now to FIGS. 1, 3, 4 and 6, for a right channel frame interval, the image data corresponding to the respective right channel frame is previously stored by the storage capacitor 306, wherein the control module 102 provides a frame select voltage signal at node 316 (F) that exceeds the threshold voltage of the second transistor 304 relative to node 332 to activate or otherwise turn on the second transistor 304 and transfer the voltage corresponding to the right channel frame to the liquid crystal 310 at node 324. The control module 102 provides the voltage at node 324 for a duration of time ($t_F$) that corresponds to the amount of time required to sufficiently charge the capacitance of node 332 to a voltage substantially equal to the voltage at node 324, that is, the voltage at node 324 minus the voltage drop across the second transistor 304 when the second transistor 304 is on. In accordance with one embodiment, the frame select time ($t_F$) is greater than or equal to one row time ($t_R$). Capacitor 308 compensates for power dissipation due to the leakage current through the liquid crystal 310 during the frame select time. The control module 102 deactivates or otherwise turns off the second transistor 304 after the frame select time ($t_F$) for the remainder of the frame interval by applying a voltage signal at node 316 that is less than the threshold voltage of the second transistor 304 relative to node 332.

To write, transfer, or otherwise store image data corresponding to the next left channel frame, the control module 102 provides a row select voltage signal at node 314 (R) that exceeds the threshold voltage of the first transistor 302 at a time within the current right channel frame interval when the voltage at node 312 ($V_D$) corresponds to the left channel frame image data for the respective liquid crystal 310. In an exemplary embodiment, the control module 102 waits for at least one dead time period ($t_d$) before applying the row select voltage signal to ensure that the second transistor 304 is turned completely off, thereby preventing the voltage representing the left channel frame image data from being transferred to node 332 and/or liquid crystal 310 during the current right channel frame interval. As described above, the control module 102 provides the voltage at node 312 for one row time ($t_R$), that is, the amount of time required to sufficiently charge the storage capacitor 306 such that the voltage at node 324 is substantially equal to the voltage at node 312. The duration of the row time ($t_R$) is less than or equal the duration of the frame interval minus the frame select time ($t_F$) and the dead time ($t_d$) divided by the number of rows of the display panel to ensure that the image data for the subsequent frame may be transferred, written to, or otherwise stored to the storage capacitor for each row of liquid crystals during the preceding frame interval. After transferring the left channel image data to the storage capacitor 306 for a respective liquid crystal 310, the control module 102 deactivates or otherwise turns off the first transistor 302 for the remainder of the frame interval by applying a voltage signal at node 314 that is less than the threshold voltage of the first transistor 302 relative to node 324 to prevent the voltage at node 324 from being modified before it is transferred to the liquid crystal 310.

As described above, the control module 102 signals the backlight controller 112 to activate or otherwise turn on the backlight assembly 110 at a particular time ($t_{LCD}$) after the beginning of the right channel frame interval that corresponds to the amount of time required to ensure each of the liquid crystals of the display panel 108 have achieved a stable transmittance and/or luminance. The control module 102 signals the lens controller 116 to activate the right lens 120 and deactivate the left lens 122 such that the right lens 120 is transparent after the right channel frame image data has been completely transferred to the liquid crystals. Prior to the subsequent left channel frame interval, the control module 102 signals the backlight controller 112 to deactivate or otherwise turn off the backlight assembly 110, and the control module 102 also signals the lens controller 116 to deactivate the both lenses 120, 122.

At the beginning of the left channel frame interval, the control module 102 provides a frame select voltage signal at node 316 (F) that exceeds the threshold voltage of the second transistor 304 relative to node 332 to activate or otherwise turn on the second transistor 304 and transfer the voltage corresponding to left channel frame from the storage capacitor 306 to the liquid crystal 310 at node 332. After waiting for at least a dead time period ($t_d$), the control module 102 provides a row select voltage signal at node 314 for one row time ($t_R$) when the voltage at node 312 corresponds to the right channel frame image data for the liquid crystal 310 to write, transfer, or otherwise store image data corresponding to the next right channel frame to storage capacitor 306. The control module 102 signals the backlight controller 112 to activate or otherwise turn on the backlight assembly 110 at a particular time ($t_{LCD}$) after the beginning of the left channel frame interval corresponding to the amount of time required for each of the liquid crystals of the display panel 108 to achieve a stable transmittance and/or luminance. The control module 102 signals the lens controller 116 to activate the left lens 122 and deactivate the right lens 120 after the left channel frame image data has been completely transferred to the liquid crystals 310. At the end of the left channel frame interval, the control module 102 signals the backlight controller 112 to deactivate or otherwise turn off the backlight assembly 110, and the control module 102 also signals the lens controller 116 to deactivate the both lenses 120, 122, before transferring the right channel frame image data from storage capacitor 306 to node 332 at the beginning of the next right channel frame interval, as described above.

Figure 7:
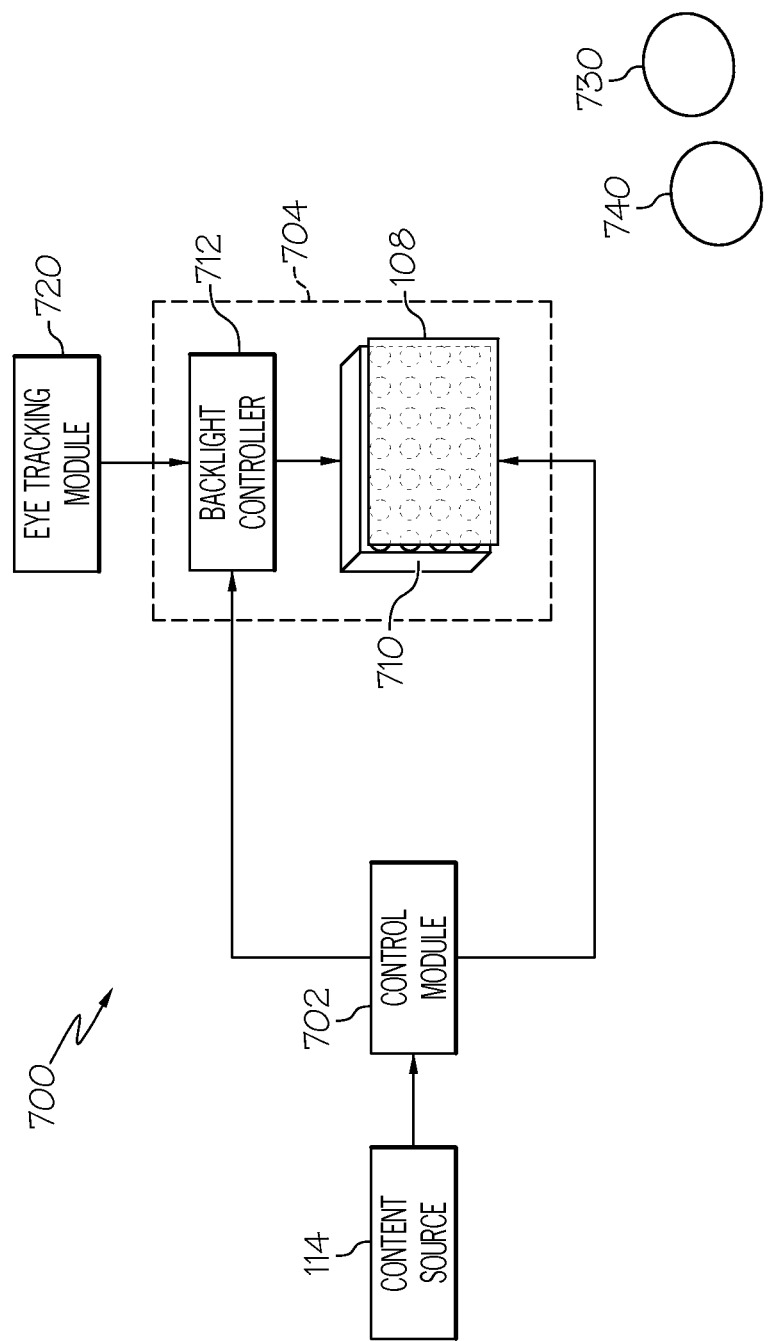
FIG. 7 is a block diagram of a display system suitable for implementing the display process of FIG. 4 in accordance with another embodiment.

FIG. 7 depicts another embodiment of a display system 700 suitable for implementing the display process 400 of FIG. 4 described above. The illustrated embodiment of display system 700 includes, without limitation, a control module 702, a display device 704, and an eye tracking module 720. The illustrated embodiment of the display device 704 includes a display panel 108, a steerable backlight assembly 710, and a backlight controller 712 coupled to the eye tracking module 720. The remaining elements of the display system 700 of FIG. 7 are similar to their counterpart elements found in the display system 100 described above with reference to FIG. 1, and these common elements will not be redundantly described in detail here in the context of display system 700.

In an exemplary embodiment, the steerable backlight assembly 710 is realized as a plurality of illumination elements, such as light-emitting diodes (LEDs), arranged in an array and having optics interposed in a viewer's line-of-sight that are capable of directing light from one or more LEDs of the array through the display panel 108 to a particular eye of the viewer. The control module 702 provides control signals to pixel drive circuits for the display elements of the display panel 108 to present images and/or video corresponding to content received from the content source 114. The control module 702 provides timing signals to the backlight controller 712 to control activation of the backlight assembly 710. Additionally, the control module 702 may identify the eye of the viewer that should perceive the image when the backlight assembly 710 is activated, for example, by notifying the backlight controller 712 of the type of frame (e.g., right channel frame or left channel frame) being presented.

The eye tracking module 720 is configured to track, determine, or otherwise identify the position of the viewer and/or the physical location of the viewer's eyes relative to the display device 704, and is preferably mounted on or near the display device 704 (e.g., on top of the display device 704) and centered with respect to the display panel 108. Based on the physical location of the viewer's eyes obtained from the eye tracking module 720, the backlight controller 712 determines the illumination elements of the backlight assembly that are configured to direct light through the display panel 108 to the appropriate eye of the viewer. For example, for a right channel frame, the backlight controller 712 obtains the location of the right eye 730 of the viewer from the eye tracking module 720, and based on the right eye location 730 and the configuration of the optics of the backlight assembly 710, the backlight controller 712 determines or otherwise identifies a subset of the illumination elements of the backlight assembly 710 that are configured to direct light through the optics and through the display panel 108 toward the right eye 730 of the viewer. Similarly, for a left channel frame, the backlight controller 712 obtains the location of the left eye 740 of the viewer from the eye tracking module 720, and based on the left eye location 740 and the configuration of the optics of the backlight assembly 710, the backlight controller 712 determines or otherwise identifies a subset of the illumination elements of the backlight assembly 710 that are configured to direct light through the optics and through the display panel 108 toward the left eye 740 of the viewer. In this manner, when the control module 702 provides timing signals to the backlight controller 712 to control activation of the backlight assembly 710, the backlight controller 712 identifies the appropriate subset of illumination elements and activates the subset of illumination elements to direct light through the display panel 108 and thereby present the frame to the appropriate eye of the viewer. As described in some embodiments, the features and/or functionality of the backlight controller 712 may be integrated into the control module 702.

For example, referring now to FIG. 4 and FIG. 7, the display process 400 may be implemented using display system 700 to present stereoscopic video on the display device 704. The display process 400 begins by transferring or otherwise writing image data for a video frame corresponding to one eye of the viewer to the display elements of the display panel 108 at the beginning of a frame interval corresponding to the respective video frame. For example, the control module 702 may operate pixel drive circuits 200, 300 of the display panel 108 to transfer voltages representing stored image data for a right channel frame of the content from content source 114 from storage capacitors to their corresponding display elements of the display panel 108. The control module 702 activates the backlight assembly 710 after the image data has been completely transferred to the display elements of the display panel 108. In this regard, the control module 702 may identify the type of frame being presented by the display panel 108 (e.g., a right channel frame) and signal the backlight controller 712 to activate or otherwise turn on the backlight assembly 710. The backlight controller 712 obtains the location of the viewer's eye corresponding to the type of frame being presented by the display panel 108 (e.g., the right eye location), and based on the eye location and the configuration of the illumination elements and/or optics of backlight assembly 710, determines the illumination elements of the backlight assembly 710 that should be illuminated to direct light through the display panel 108 to the appropriate eye of the viewer. For example, the backlight controller 712 may determine one or more LEDs of the backlight assembly 710 that are capable of directing light through the optics and the display panel 108 to the right eye location 730, and then activate or turn on those LEDs to illuminate the display panel 108 and present a right channel frame to the right eye 730 of the viewer.

As described above, the control module 702 writes, transfers, or otherwise stores image data for a subsequent video frame corresponding to the other eye of the viewer, for example, by storing voltages corresponding to a left channel frame of the content from content source 114 to storage capacitors while the display elements of the display panel 108 are presenting the preceding right channel frame. The control module 702 and/or backlight controller 712 deactivates or otherwise turns off the backlight assembly 710 before updating and/or refreshing the display panel 108. After deactivating the backlight assembly 710, the control module 702 transfers stored image data for a left channel frame from storage capacitors to the display elements of the display panel 108. After transferring the left channel frame data, the control module 702 activates the backlight assembly 710 by identifying the type of frame being presented by the display panel 108 (e.g., a left channel frame) and signaling the backlight controller 712 to activate or otherwise turn on the backlight assembly 710. The backlight controller 712 obtains the viewer's left eye location 740, and based on the left eye location 740 and the configuration of the illumination elements and/or optics of the backlight assembly 710, determines the illumination elements that should be illuminated to direct light through the display panel 108 to the left eye 740 of the viewer. For example, the backlight controller 712 may determine one or more LEDs capable of directing light through the optics and display panel 108 to the left eye location 740, and then activate or otherwise turn on those LEDs to illuminate the display panel 108 and present a left channel frame to the left eye 740 of the viewer. At the end of the left channel frame interval, the backlight assembly 710 is deactivated before the control module 702 transfers stored image data for a right channel frame to the display panel 108, as described above. In this manner, the backlight assembly 710 directs light to the appropriate eye of the viewer and does not illuminate the display panel 108 when transferring image data to prevent crosstalk.

To briefly summarize, one advantage of the methods and systems described above is that image data for a respective video frame is transferred to all of the display elements of a display panel at the beginning of a frame interval, which in turn, allows for a backlight and/or a shutter lens corresponding to the respective video frame to be activated for a greater percentage of the frame interval. Because the backlight is turned on and/or the shutter lens is transparent for a greater percentage of the frame interval, the perceived luminance and image quality of the display panel is improved. Additionally, because all of the display elements of the display panel receive the image data at substantially the same time, the luminance is more uniformly perceived across the display. The image data for a subsequent video frame is stored during the preceding frame interval, thereby allowing the image data to be transferred to the display elements at the beginning of the subsequent frame interval. The backlight is turned off and the shutter lenses are returned to an opaque state before the stored image data is transferred to the display elements, thereby conserving energy and preventing crosstalk (i.e., a viewer perceiving a frame with the inappropriate eye) when field-sequential stereo imagery is presented.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context. As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

For the sake of brevity, conventional techniques related to image processing, video processing, video encoding and/or decoding, stereoscopic imaging, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method of presenting content comprising a plurality of frames on a display panel comprising a plurality of drive circuits and a plurality of display elements coupled to a first node configured to receive a bias voltage, wherein each drive circuit includes a first energy storage element coupled between a second node and a ground reference node, a second energy storage element coupled between a third node and the ground reference node, and a fourth node coupled to a respective display element of the plurality of display elements, the respective display element being coupled between the first node and the fourth node of the respective drive circuit, the method comprising:

transferring all image data for a first frame of the plurality of frames at the beginning of a first frame interval by transferring respective image data for the first frame to each respective display element of the plurality of display elements from the second node coupled to the first energy storage element of each respective pixel drive circuit to the fourth node of the respective pixel drive circuit coupled to the respective display element at the beginning of the first frame interval;

activating an illumination assembly after the transferring of all of the image data for the first frame to the plurality of display elements to present the first frame;

activating a first lens configured to be aligned with a first eye of a prospective viewer during the first frame interval after the transferring of all of the image data for the first frame to the plurality of display elements, wherein the first frame corresponds to the first eye;

transferring, for each respective display element of the plurality of display elements, image data for a second frame of the plurality of frames to the third node coupled to the second energy storage element of the respective pixel drive circuit corresponding to the respective display element during the first frame interval;

deactivating the illumination assembly prior to transferring the image data for the second frame to each respective display element of the plurality of display elements at the beginning of a second frame interval from the third node coupled to the second energy storage element of the respective pixel drive circuit to the fourth node of the respective pixel drive circuit coupled to the respective display element; and deactivating the first lens prior to transferring the image data for the second frame to the plurality of display elements.

2. The method of claim 1, further comprising:

transferring the image data for the second frame to each respective display element of the plurality of display elements from the third node coupled to the second energy storage element of the respective pixel drive circuit to the fourth node of the respective pixel drive circuit coupled to the respective display element at the beginning of the second frame interval, the second frame interval being subsequent the first frame interval; and after transferring image data for the second frame to the plurality of display elements:
activating the illumination assembly; and
activating a second lens configured to be aligned with a second eye of the prospective viewer.

3. The method of claim 2, further comprising:
deactivating the illumination assembly prior to transferring image data for a third frame to the plurality of display elements, the third frame being subsequent the second frame; and
deactivating the second lens prior to transferring image data for the third frame to the plurality of display elements.

4. The method of claim 1, the first energy storage element comprising a first capacitor and the second energy storage element comprising a second capacitor, wherein:
transferring the image data for the first frame comprises activating a first transistor coupled between the fourth node and the second node to transfer a first voltage from the first capacitor to a respective display element; and
transferring the image data for the second frame to the second energy storage element comprises activating a second transistor coupled between the third node and a fifth node to transfer a second voltage to the second capacitor.

5. The method of claim 4, wherein:
transferring the image data for the first frame further comprises deactivating a third transistor coupled between the fourth node and the third node; and
transferring the image data for the second frame to the second energy storage element further comprises deactivating a fourth transistor coupled between the fifth node and the second node.

6. The method of claim 1, the backlight including a plurality of illumination elements, wherein activating the illumination assembly comprises:
identifying a set of one or more illumination elements of the illumination assembly configured to direct light through the display element towards an eye location for the first eye corresponding to the first frame; and
activating the set of one or more illumination elements to direct light through the display element.

7. The method of claim 1, further comprising:
transferring all of the image data for the second frame at the beginning of the second frame interval to the plurality of display elements by transferring respective image data for the second frame from the third node coupled to the second energy storage element of each respective pixel drive circuit to the fourth node of each respective pixel drive circuit coupled to each respective display element at the beginning of the second frame interval, the second frame interval being subsequent the first frame interval; and
after the transferring of all of the image data for the second frame to the plurality of display elements:
activating the illumination assembly; and
activating a second lens configured to be aligned with a second eye of the prospective viewer.

8. A display system for presenting content comprising a plurality of frames to a viewer, the display system comprising:
an illumination assembly;
a display panel comprising:
a plurality of display elements coupled to a first node configured to receive a bias voltage; and
a plurality of drive circuits, wherein each drive circuit includes:
a first energy storage element coupled between a second node and a ground reference node;
a second energy storage element coupled between a third node and the ground reference node; and
a fourth node coupled to a respective display element of the plurality of display elements, the respective display element being coupled between the first node and the fourth node of the respective drive circuit; and
a control module coupled to the illumination assembly and the display panel, wherein the control module is configured to:
transfer all image data corresponding to a first frame of the plurality of frames to the plurality of display elements at the beginning of a first frame interval by transferring, for each respective display element of the plurality of display elements, image data corresponding to the first frame from the second node to the fourth node at the beginning of the first frame interval;
store image data corresponding to a second frame for each display element of the plurality of display elements during the first frame interval, the image data for each display element being stored by the respective second energy storage element corresponding to the respective display element;
activate the illumination assembly to direct light towards the display panel after transferring the image data for the first frame to the plurality of display elements; and
deactivate the illumination assembly prior to transferring the stored image data for the second frame to the plurality of display elements at the beginning of a second frame interval from the third node to the fourth node for each respective display element of the plurality of display elements at the beginning of the second frame interval.

9. The display system of claim 8, further comprising:
a first lens coupled to the control module, the first lens being configured to be aligned with a first eye of the viewer; and
a second lens coupled to the control module, the second lens being configured to be aligned with a second eye of the viewer, wherein the control module is configured to:
activate the first lens during the first frame interval after transferring image data for the first frame to the plurality of display elements;
deactivate the second lens during the first frame interval; and
deactivate the first lens prior to transferring the stored image data for the second frame to the plurality of display elements.

10. The display system of claim 9, wherein the control module is configured to:
transfer the stored image data corresponding to the second frame to the plurality of display elements at the beginning of the second frame interval by transferring, for each respective display element of the plurality of display elements, the image data corresponding to the second frame from the third node to the fourth node, the second frame interval being subsequent the first frame interval; and
after transferring image data for the second frame to the plurality of display elements:
activate the illumination assembly;
activate the second lens; and
deactivate the first lens.

11. The display system of claim 10, wherein the control module is configured to:

store image data corresponding to a third frame of the plurality of frames for each display element of the plurality of display elements during the second frame interval, the image data for each display element being stored by the respective first energy storage element corresponding to the respective display element, the third frame being subsequent the second frame; and deactivate the illumination assembly and the second lens prior to transferring the stored image data for the third frame to the plurality of display elements at the beginning of a third frame interval by transferring, for each respective display element of the plurality of display elements, the image data corresponding to the third frame from the second node to the fourth node.

12. The display system of claim 8, the illumination assembly including a plurality of illumination elements, wherein the control module is configured to activate the illumination assembly by activating a first set of one or more illumination elements of the plurality of illumination elements, the first set of illumination elements being configured to direct light through the display panel towards an eye location for a first eye of a viewer corresponding to the first frame.

13. The display system of claim 12, wherein the control module is configured to:

transfer the stored image data corresponding to the second frame to the plurality of display elements at the beginning of the second frame interval by transferring, for each respective display element of the plurality of display elements, the image data corresponding to the second frame from the third node to the fourth node, the second frame interval being subsequent the first frame interval; and after transferring image data for the second frame to the plurality of display elements activate the illumination assembly by activating a second set of one or more illumination elements of the plurality of illumination elements, the second set of illumination elements being configured to direct light through the display panel towards an eye location for a second eye of the viewer corresponding to the second frame.

14. The display system of claim 8, wherein each drive circuit includes:

a first transistor coupled between an image data node and the second node;

a second transistor coupled between the image data node and the third node;

a third transistor coupled between the second node and the first node; and a fourth transistor coupled between the third node and the first node.

15. The display system of claim 14, further comprising:

a fifth node configured to receive a left channel frame select signal; and a sixth node configured to receive a right channel frame select signal, wherein:

a gate terminal of the third transistor of each drive circuit is coupled to the fifth node;

a gate terminal of the fourth transistor of each drive circuit is coupled to the sixth node;

the control module transfers the image data corresponding to the first frame to the plurality of display elements by providing the left channel frame select signal at the beginning of the first frame interval; and the control module transfers the image data corresponding to the second frame to the plurality of display elements by providing the right channel frame select signal at the beginning of the second frame interval.

16. A method of presenting content comprising a plurality of frames using a plurality of display elements, each respective display element of the plurality being coupled to a node configured to receive a bias voltage, the method comprising:

transferring all image data for a first right channel frame of the plurality of frames to the plurality of display elements at the beginning of a right channel frame interval by transferring, for each respective display element of the plurality of display elements, the respective image data for the first right channel frame corresponding to the respective display element from a first capacitor coupled to a ground reference node to the respective display element at the beginning of the right channel frame interval;

storing image data for a left channel frame of the plurality of frames during the right channel frame interval, wherein for each display element of the plurality of display elements, the respective image data for the left channel frame is stored by a second capacitor corresponding to the respective display element, the second capacitor being coupled to the ground reference node;

activating an illumination assembly during the right channel frame interval after the transferring of all of the image data for the first right channel frame to the plurality of display elements to present the first right channel frame to a right eye of a viewer;

deactivating the illumination assembly prior to transferring the image data for the left channel frame to the plurality of display elements;

transferring all of the image data for the left channel frame to the plurality of display elements at the beginning of a left channel frame interval by transferring, for each respective display element of the plurality of display elements, the respective image data for the left channel frame from the second capacitor to the respective display element at the beginning of the left channel frame interval; and activating the illumination assembly during the left channel frame interval after the transferring of all of the image data for the left channel frame to the plurality of display elements to present the left channel frame to a left eye of the viewer.

17. The method of claim 16, wherein:

deactivating the illumination assembly comprises deactivating the illumination assembly prior to the beginning of the left channel frame interval, the left channel frame interval being subsequent the right channel frame interval.

18. The method of claim 17, further comprising:

activating a first lens configured to be aligned with the right eye of the prospective viewer during the right channel interval after transferring the image data for the first right channel frame to the plurality of display elements;

deactivating the first lens prior to transferring the image data for the left channel frame to the plurality of display elements; and activating a second lens configured to be aligned with the left eye of the prospective viewer during the left channel frame interval after transferring the image data for the left channel frame to the plurality of display elements.

19. The method of claim 17, further comprising:

storing image data for a second right channel frame of the plurality of frames during the left channel frame interval; and deactivating the illumination assembly prior to transferring image data for the second right channel frame to the plurality of display elements.

20. The method of claim 16, the illumination assembly including a plurality of illumination elements, wherein:
- activating the illumination assembly to present the first right channel frame comprises activating a first set of one or more illumination elements of the illumination assembly to direct light through the plurality of display elements towards the right eye of the viewer; and
- activating the illumination assembly to present the left channel frame comprises activating a second set of one or more illumination elements of the illumination assembly to direct light through the plurality of display elements towards the left eye of the viewer.

\* \* \* \* \*